United States Patent [19]

Burson

[11] 4,213,436

[45] Jul. 22, 1980

[54] CAPACITOR DISCHARGE IGNITION AND ALTERNATOR AUXILIARY POWER SYSTEM

[75] Inventor: Bob O. Burson, East Longmeadow, Mass.

[73] Assignee: R. E. Phelon Company, Inc., East Longmeadow, Mass.

[21] Appl. No.: 941,985

[22] Filed: Sep. 13, 1978

Related U.S. Application Data

[63] Continuation of Ser. No. 771,019, Feb. 22, 1977, abandoned.

[51] Int. Cl.[2] .......................... F02P 1/00; H02K 21/22

[52] U.S. Cl. .................................... 123/599; 123/605; 310/70 A

[58] Field of Search ........ 123/148 CC, 149 R, 149 D, 123/148 E; 315/209 SC, 209 CD, 218; 310/153, 156, 70 A

[56] References Cited

U.S. PATENT DOCUMENTS

| | | | |
|---|---|---|---|
| 2,806,156 | 9/1957 | Phelon | 310/70 A |
| 3,367,314 | 2/1968 | Hirosawa et al. | 123/148 CC |
| 3,746,901 | 7/1973 | Haubner et al. | 310/70 A |
| 3,795,235 | 3/1974 | Donohue et al. | 123/148 E |
| 3,911,886 | 10/1975 | Nagasawa | 123/148 CC |
| 3,942,501 | 3/1976 | Byles | 123/148 CC |
| 3,955,549 | 5/1976 | Burson | 123/148 CC |
| 3,974,816 | 8/1976 | Henderson et al. | 123/148 CC |
| 4,036,201 | 7/1977 | Burson | 123/148 CC |

FOREIGN PATENT DOCUMENTS 52-17807 2/1977 Japan .

*Primary Examiner*—Charles J. Myhre
*Assistant Examiner*—P. S. Lall
*Attorney, Agent, or Firm*—McCormick, Paulding & Huber

[57] ABSTRACT

In a combined capacitor discharge ignition and alternator auxiliary power system for an internal combustion engine, voltage pulses for charging a capacitor, other voltage pulses for triggering an SCR, and still other voltage pulses for producing an alternating auxiliary power output are provided by a single generator having an engine driven rotor providing an array of magnetic pole faces regularly spaced and of alternating magnetic polarity along a circular path of movement. A stator carries a charge coil, a trigger coil, and at least one auxiliary power coil adjacent the circular path so that a repetitive series of charge pulses, a repetitive series of trigger pulses, and a repetitive series of auxiliary power pulses are induced respectively in the charge coil, the trigger coil, and the auxiliary power coil each time the array passes said coils. The rotor also includes a space, along the circular path, within which no magnetic pole face appears. When this space passes the trigger coil, at least some of the pole faces of the array pass the charge coil to produce charging pulses which charge the capacitor. The capacitor is then discharged, to fire the associated spark plug, by the first trigger pulse of the next series of such pulses induced in the trigger coil. Subsequent trigger pulses of the series occur with the capacitor in a discharged state and therefore do not fire the spark plug. Thus, the same magnet pole faces which excite the trigger and charge coils of the ignition portion of the system also excite the auxiliary power coils of the alternator portion of the system without creating a ripple problem common to other combined ignition and alternator systems wherein the alternator magnets generate ripple voltages in the trigger coil which may result in spurious triggering of the SCR.

8 Claims, 25 Drawing Figures

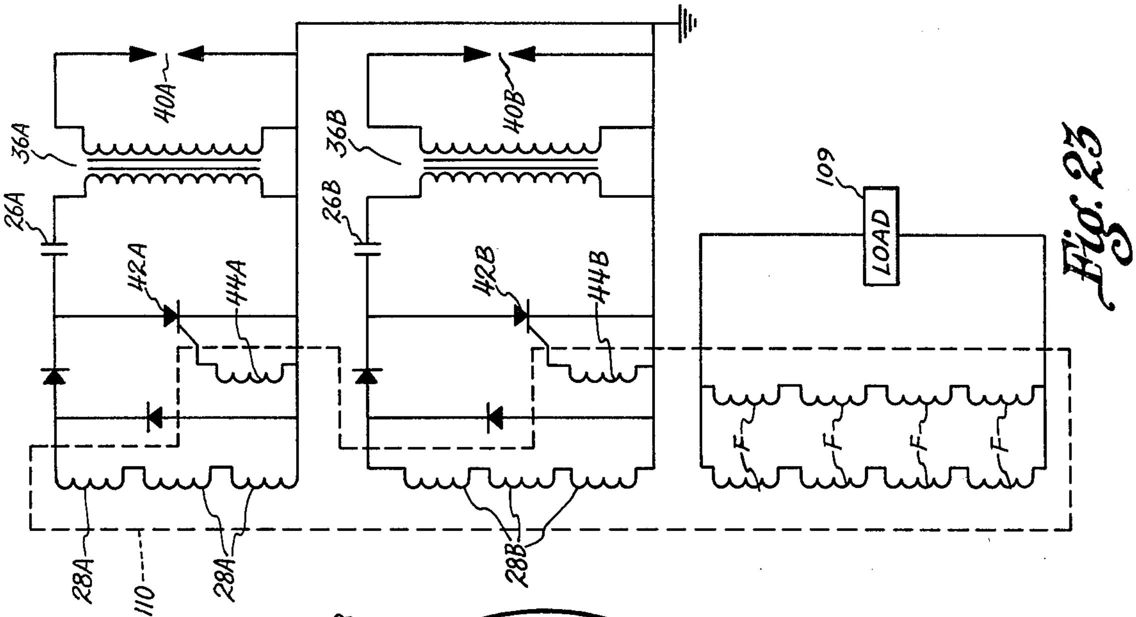
Fig. 23
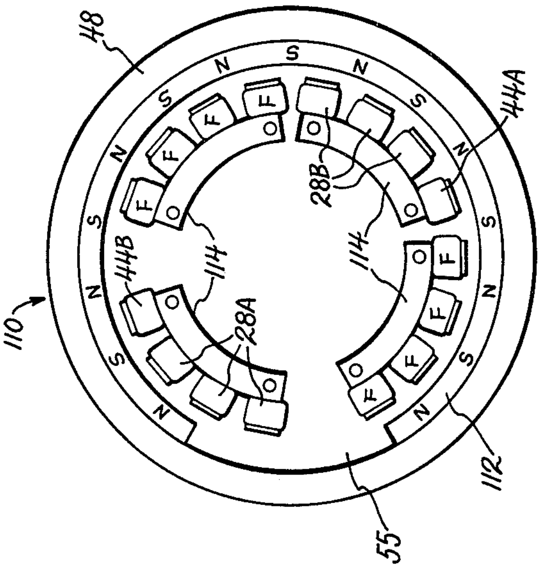
Fig. 22
Fig. 20
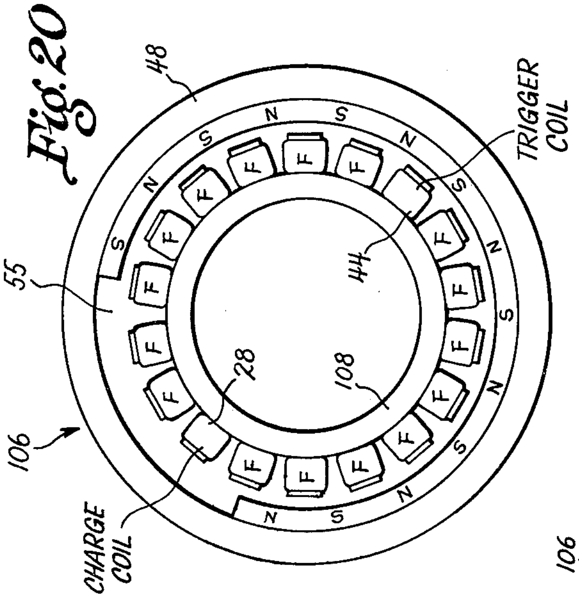
Fig. 21
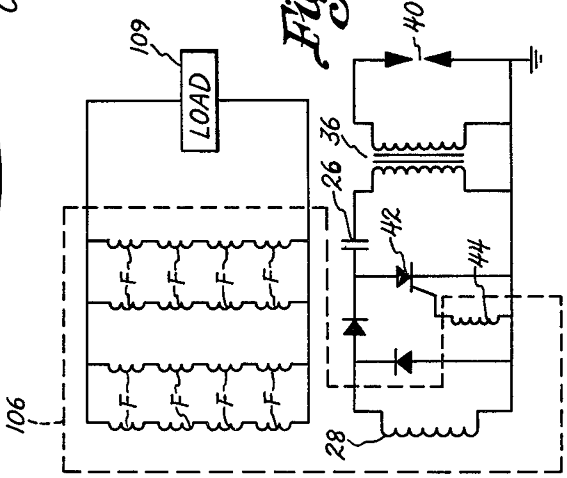

Fig. 24
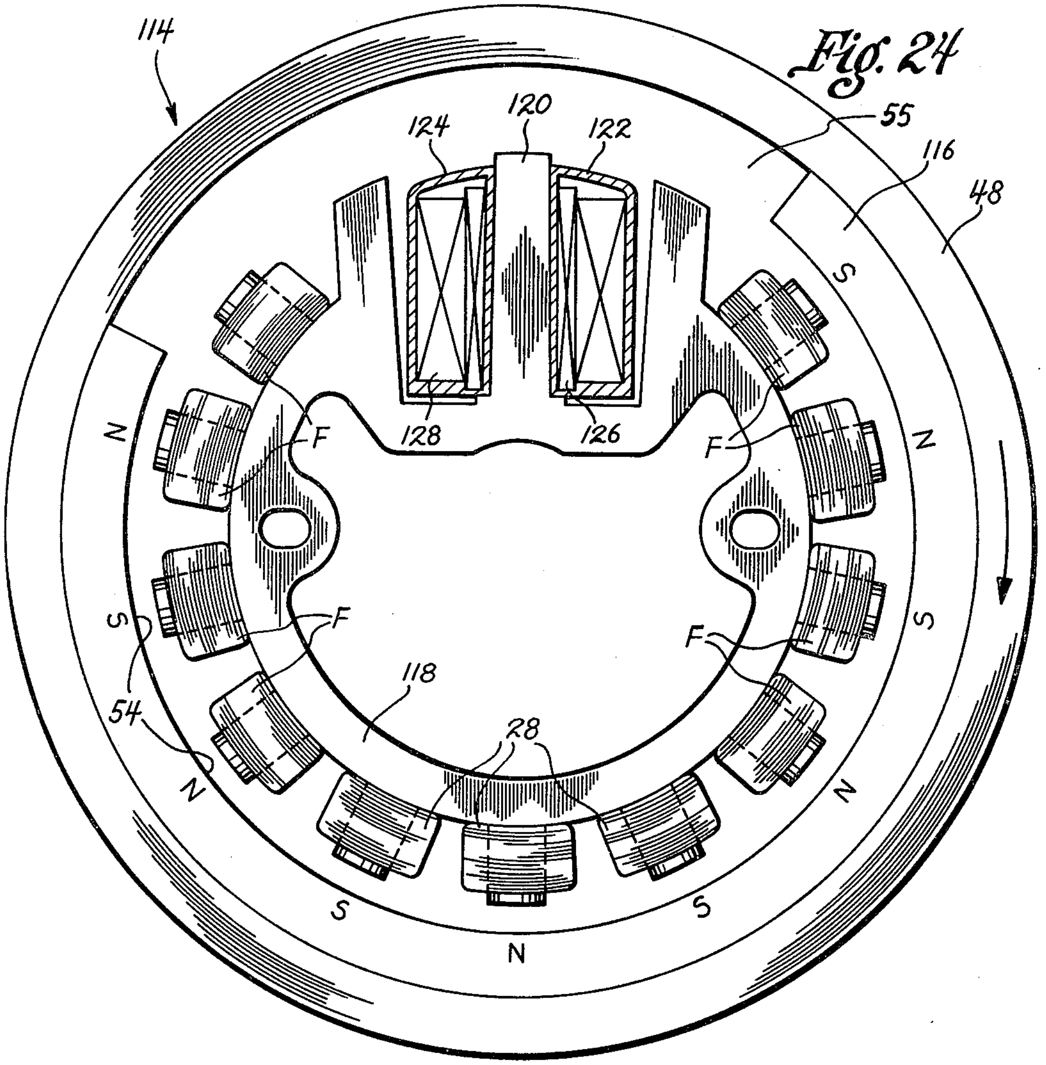
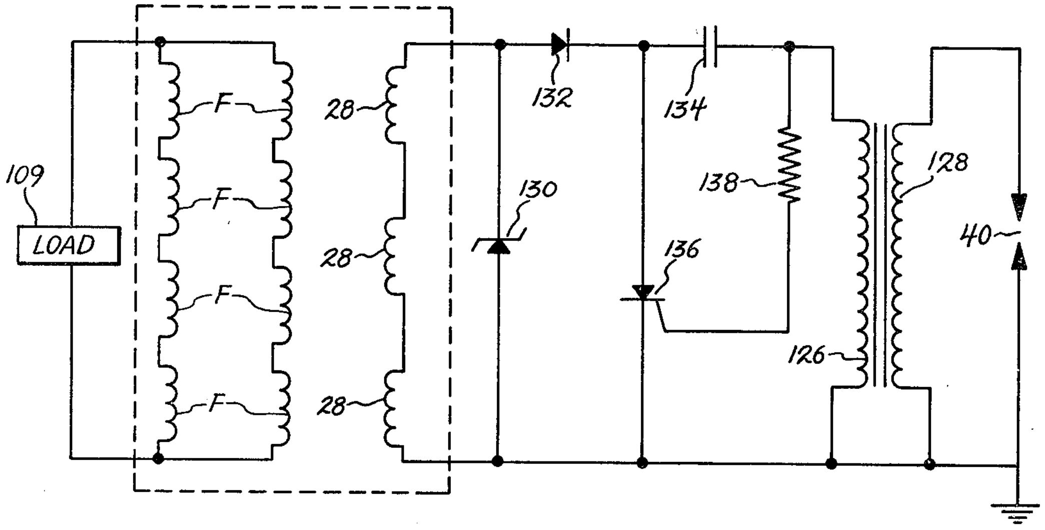
Fig. 25

CAPACITOR DISCHARGE IGNITION AND ALTERNATOR AUXILIARY POWER SYSTEM

This is a continuation of application Ser. No. 771,019 filed Feb. 22, 1977 and now abandoned.

BACKGROUND OF THE INVENTION

This invention relates to combined capacitor discharge ignition and alternator auxiliary power systems for internal combustion engines, and deals more particularly with such a system wherein power for charging the ignition capacitor, for triggering an electronic switch element controlling the discharge of the capacitor and for providing an auxiliary power output are provided by separate coils of a generator driven by the engine.

In the capacitor discharge ignition portion of a system of the type with which this invention is concerned, a capacitor after being charged is discharged, in proper timed relation to the operation of the engine, through the primary winding of an ignition transformer to fire a spark plug connected to the transformer's secondary winding. The capacitor is connected to the transformer's primary winding through a silicon controlled rectifier, or other triggered electronic switch element, and its discharge is controlled by a trigger signal supplied to the switch element.

The present invention concerns primarily an improved generator for providing electrical power to charge the capacitor and to trigger the electronic switch element of an ignition circuit such as aforesaid, and for also providing an auxiliary power output for battery charging, lights or other purposes. In particular, an object of this invention is to provide a combined capacitor discharge ignition and auxiliary power system having an improved generating means for producing power for charging the system's capacitor, for triggering the system's electronic switch at proper times in the operating cycle of the associated engine, and for providing an auxiliary output for lighting, battery charging or the like. In keeping with this object, a more specific object is to provide such a generator having a rotor with a permanent magnet means providing a single array of magnetic pole faces which cooperates with a charging coil, a trigger coil and an auxiliary power coil so that the pole faces induce capacitor charging voltages in the charge coil, induce triggering voltages in the trigger coil, and induce auxiliary power voltages in the auxiliary power coil with properly timed discharges of the capacitor being achieved despite the fact that a number of trigger pulses are induced in the trigger coil each time the magnet pole face array passes the trigger coil.

Another object of the invention is to provide a combined capacitor discharge ignition and alternator auxiliary power system having a generator which is capable of assuring adequate charge of the capacitor even at relatively low engine speeds as a result of the capacitor being charged, during each charging cycle, by a plurality of charging pulses.

Another object of the invention is to provide a system such as aforesaid wherein the generator includes a plurality of auxiliary power output coils energized by the same magnet means as energizes the charge and trigger coils and wherein the number of magnetic pole faces provided by the permanent magnet means is of a relatively large number, to provide a high output from the auxiliary power coils, without adversely effecting the capacitor charging and discharge timing functions of the charge and trigger coils.

Another object of the invention is to provide a generator for a capacitor discharge ignition which may be fabricated to either provide or not provide an auxiliary power output by either including or not including a stator segment or segments carrying auxiliary power coils in a basic generator structure.

A still further object of the invention is to provide a system of the aforesaid character wherein the trigger coil of the generator also serves as the primary winding of the ignition transformer and is mounted on a stator pole of the generator along with the secondary coil of the transformer to form a unitized compact arrangement of parts.

Other objects and advantages of the invention will be apparent from the following description and from the drawings forming a part hereof.

SUMMARY OF THE INVENTION

The invention resides in a combined capacitor discharge ignition and alternator auxiliary power system having a capacitor, a triggered electronic switch element and a generator for producing both charge and trigger voltage pulses for respectively charging the capacitor and triggering the switch element and for also producing an auxiliary power output. The generator includes a stator carrying a charge coil connected in charging relationship with the capacitor, a trigger coil connected in triggering relationship with the switch element, and at least one auxiliary power coil. The rotor of the generator, driven by the associated engine, includes a permanent magnet means providing at least one array of at least three, and preferably more, magnetic pole faces spaced from one another at regular intervals along a circular path of movement with the pole faces being of alternating magnetic polarity along the path. The charge coil, trigger coil and auxiliary power coil are positioned adjacent the circular path of the magnet pole faces so that each time the array passes these coils, a repetitive series of charge pulses is induced in the charge coil, a repetitive series of trigger pulses is induced in the trigger coil, and a repetitive series of auxiliary power pulses. The magnet array does not extend along the full extent of the circular path and therefore the rotor along that path has at least one space where no magnetic pole face appears. The charge coil and trigger coil are arranged relative to one another along the circular path so that as the space on the rotor passes the trigger coil at least some of the magnetic pole faces pass the charge coil to induce capacitor charging charge pulses in the charge coil. The so charged capacitor is then subsequently discharged by the first trigger pulse of the next series of such pulses produced when the array of pole faces next passes the trigger coil.

The invention still further resides in, among other things: (1) the parts of the generator being arranged so that the capacitor is charged by a plurality of charge pulses during each charging cycle, (2) the generator including a plurality of additional coils energized by the magnetic pole faces of the array for producing an auxiliary power output, (3) the generator including two trigger coils and two charge coils for use with two capacitor discharge systems associated respectively with the two spark plugs of a two cylinder engine, and (4) the trigger coil also serving as the primary winding of the ignition transformer and being mounted on a stator pole of the generator in inductively coupled relationship with the secondary winding of the transformer mounted on the same pole.

BRIEF DESCRIPTION OF THE DRAWINGS

FIG. 20 is a view similar to FIG. 1 but shows still another generator construction for use in a capacitor discharge ignition system embodying the invention.

FIG. 21 is a wiring diagram showing the generator of FIG. 20 incorporated in a capacitor discharge ignition system embodying the invention.

FIG. 22 is a view similar to FIG. 1 showing still another construction of a generator for use in a capacitor discharge ignition system embodying this invention.

FIG. 23 is a wiring diagram of a capacitor discharge ignition system embodying the invention and incorporating the generator of FIG. 22.

FIG. 24 is a view generally similar to FIG. 1 showing yet another construction of a generator for use in a capacitor discharge ignition system embodying this invention.

FIG. 25 is a wiring diagram of a capacitor discharge ignition system embodying the invention and incorporating the generator of FIG. 24.

DETAILED DESCRIPTION OF THE PREFERRED EMBODIMENTS

Figure 2:
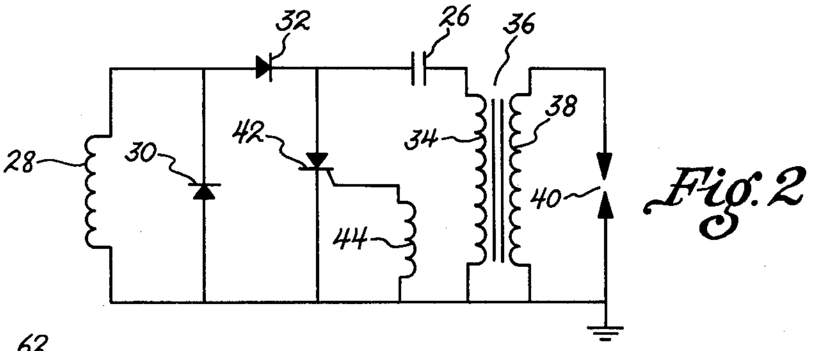
FIG. 2 is a schematic wiring diagram of a capacitor discharge ignition system including the generator of FIG. 1.

Turning to the drawings and first considering FIG. 2, a capacitor discharge ignition arrangement of the type employed in an ignition and auxiliary power system embodying this invention includes a capacitor 26 connected in charging relationship with a charge coil 28 by a circuit including two diodes 30 and 32. The capacitor is also connected in series with the primary winding 34 of an ignition transformer 36 having a secondary winding 38 connected to the associated spark plug 40 of the associated engine. Discharge of the capacitor through the primary winding 34 is controlled by an electronic switch element in the form of a silicon controlled rectifier 42 having a trigger terminal to which trigger pulses are supplied by a trigger coil 44.

Figure 1:
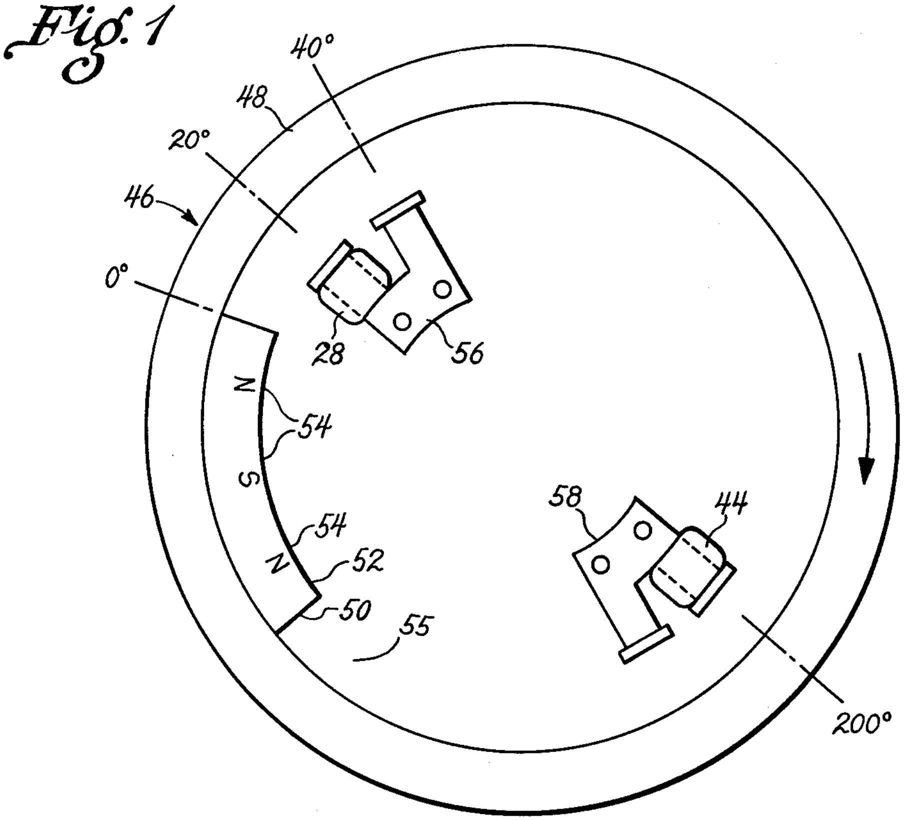
FIG. 1 is a view, somewhat schematic, of a generator for use in a capacitor discharge ignition system embodying this invention.

The charge coil 28 and the trigger coil 44 of the FIG. 2 circuit are part of the generator 46 shown in FIG. 1. Referring to this figure, the generator includes a rotor 48 which in use is connected to the crank shaft or other moving part of an associated internal combustion engine so as to be driven in synchronism with the engine's operation. Carried by the rotor is a permanent magnet means in the form of an arcuate magnet 50 which is radially charged to provide on its inner face 52 three magnetic pole faces 54, 54 which move about a circular path as the rotor rotates, the normal direction of rotation being assumed to be clockwise as indicated by the arrow. The pole faces 54, 54 are of alternating magnetic polarity along their circular path of movement and they are spaced from one another at regular intervals along the path, each such interval in the construction of FIG. 1 being equal to 20 angular degrees. The charge coil 28 is mounted on one leg of a two-legged stator 56 fixed relative to the stationary structure of the associated engine. The legs of the stator 56 are located adjacent the path of the magnetic pole faces 54, 54 and are spaced from one another along that path by the same spacing as that of the pole faces 54, 54. Likewise, the trigger coil 44 is carried by one leg of a similar two-legged stator 58. The magnet 50 is less than completely circular and therefore the rotor 48 along the circular locus of the magnetic pole faces 54, 54 includes a space 55 within which no magnetic pole face appears, such space in the generator 46 being equal to 300 angular degrees.

Figure 3:
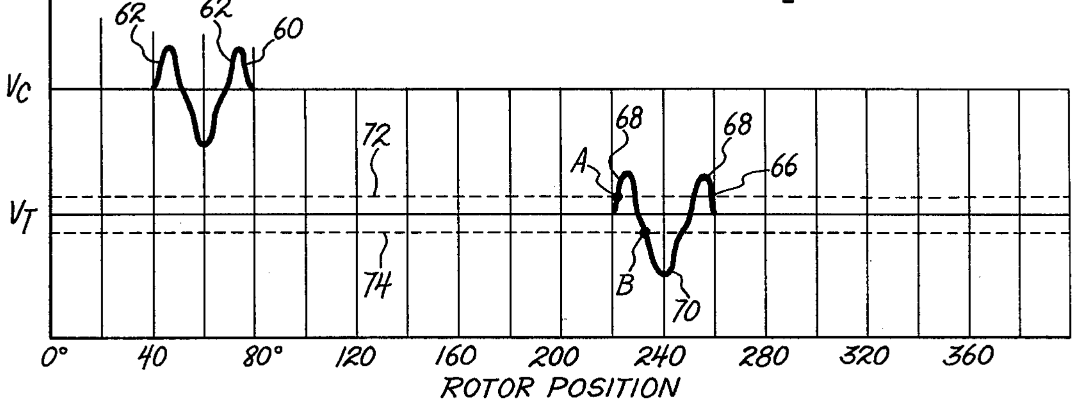
FIG. 3 is a diagram illustrating the charging and triggering voltage waveforms induced in the charging and triggering coils of the generator of FIG. 1.

As the rotor 48 rotates, the magnetic pole faces 54, 54 of the magnet 50 pass the stators 56 and 58 and generate voltage waveforms in the charge coil 28 and trigger coil 44. FIG. 3 shows such waveforms as generated during one complete rotation of the rotor 48 with the rotor position shown in FIG. 1 being taken as the 0° position. The voltage waveform induced in the charge coil is indicated at 60 and includes two pulses 62, 62 of one polarity and another pulse 64 of the opposite polarity. The waveform induced in the trigger coil is indicated at 66 and also has two pulses, 68, 68 of one polarity and another pulse 70 of the opposite polarity. The diode 30 and 32 of the system of FIG. 2 in effect form a half-wave rectifier and permit only pulses of one polarity to charge the capacitor 26, and either the pulses 62, 62 or the pulse 64 may be chosen to charge the capacitor by choosing the manner in which the two ends of the charge coil are connected to the remainder of the system. Similarly, either the pulses 68, 68 or the pulse 70 of the trigger coil 44 may be used to trigger the SCR 42 depending on the manner in which the trigger coil 44 is connected into the system. In FIG. 3, the broken line 72 indicates the voltage level at which triggering of the SCR 42 occurs assuming the pulses 68, 68 to be the triggering pulses and the broken line 74 indicates the level at which triggering occurs assuming the pulse 70 to be the triggering pulse.

With further reference to FIGS. 1 and 3, the arrangement of the generator parts is such that as the pole faces 54, 54 of the magnet 50 pass the charge coil 28 to induce the voltage waveform 60 therein, no such magnet pole faces pass the trigger coil 44. Therefore, no trigger pulses occur simultaneously with the charge pulses and the charge pulses which do occur are allowed to charge the capacitor. With the capacitor so charged, it is subsequently discharged when the first trigger pulse of the next triggering voltage waveform 66 subsequently appears. If the pulses 68, 68 are used as trigger pulses, this discharge of the capacitor occurs at the point marked A in FIG. 3. If the pulse 70 is used as the trigger pulse, this discharge occurs at the point marked B. In either case, the rotor position at the time of discharge is so related to the engine cycle that the discharge occurs at the proper time in the engine cycle.

One advantage of the construction of the generator 46 is that by connecting the charge coil 28 in the appropriate manner to the remainder of the circuit, the capacitor 26 during each cycle of operation may receive two charging pulses, namely the pulses 62, 62, and thus may become more adequately charged, particularly at the low rotor speeds, than would be the case if only supplied with one charging pulse. This advantage of increasing the total charge supplied to the capacitor prior to each discharge may be further enhanced by increasing the number of magnetic pole faces 54, 54 in the array of such faces provided by the permanent magnet means of the rotor. For example, FIGS. 4, 6, 8, 10, 12 and 14 show respectively generators 76, 78, 80, 82, 84 and 86 which are similar to that of the generator 46 of FIG. 1 except for having permanent magnets 88, 90, 92, 94, 96 and 98 with increasing numbers of magnetic pole faces.

Figure 4:
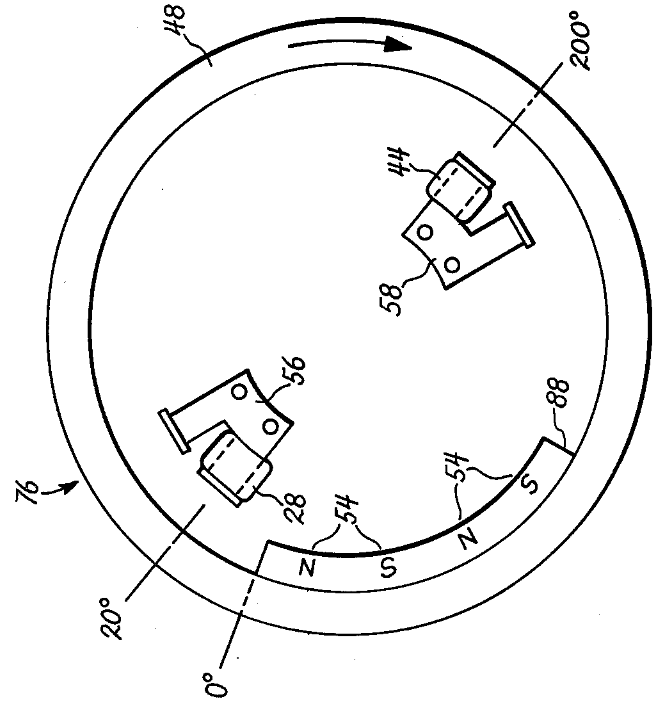
Figure 5:
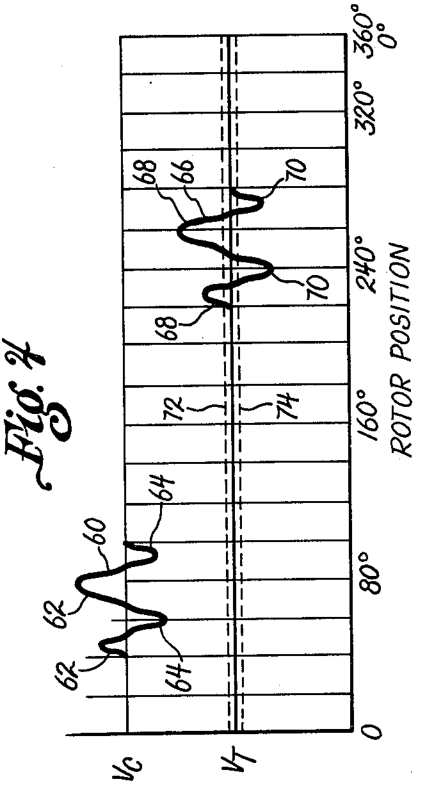

Referring to FIG. 4, the generator 76 is identical to the generator 46 of FIG. 1 except for having an arcuate permanent magnet 88 providing four, rather than three, magnetic pole faces 54, 54. The result of this, as shown in FIG. 5, is that each of the voltage waveforms 60 and 66 induced in the charge and trigger coils 28 and 44, respectively, include one additional pulse. That is, the voltage waveform 60 includes two pulses 62, 62 of one polarity and two pulses 64, 64 of the opposite polarity, and likewise the trigger voltage waveform 66 includes two pulses 68, 68 of one polarity and two pulses 70, 70 of the opposite polarity. Also, the first and last pulse of each waveform is smaller than the relatively larger intermediate pulses. Therefore, regardless of which polarity is chosen for charging the capacitor, each cycle of the waveform 60 provides one small pulse and one large pulse for charging the capacitor.

Figure 6:
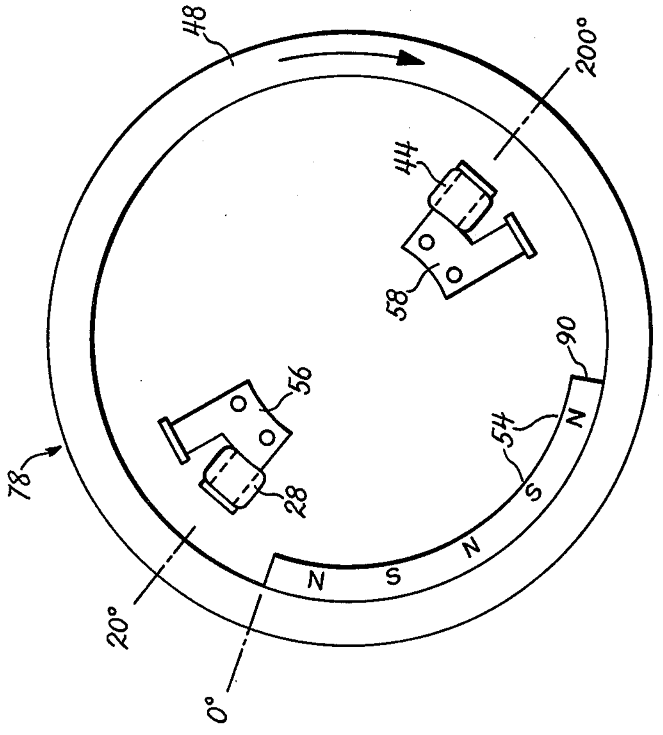
FIGS. 4, 6, 8, 10, 12, 14, 16 and 18 are views generally similar to FIG. 1 but show various different generator constructions for use in capacitor discharge ignition systems embodying this invention.
Figure 7:
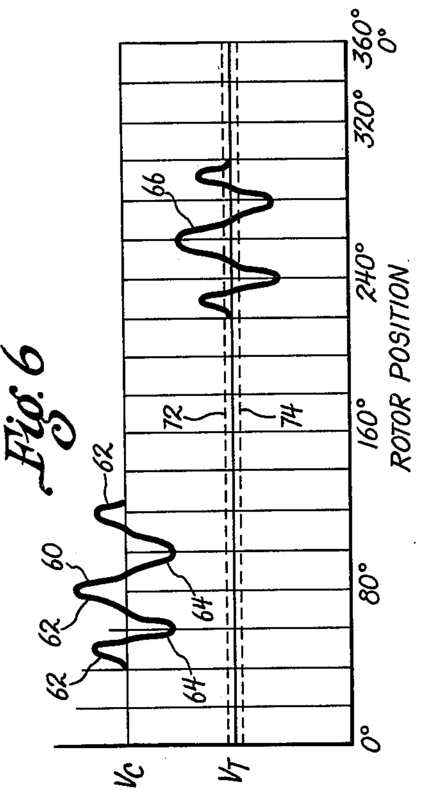
FIGS. 5, 7, 9, 11, 13, 15, 17 and 19 are diagrams illustrating the open circuit charging and triggering voltage waveforms produced respectively by the generators of FIGS. 4, 6, 8, 10, 12, 14, 16 and 18.

Referring to FIG. 6, the generator 78 is similar to the generator 76 of FIG. 4 except for having a magnet 90 including one additional magnetic pole face 54. As shown in FIG. 7, each waveform 60 and 66 produced by the generator 78 includes five voltage pulses. By choosing the polarity of the pulses 62, 62 as the capacitor charging polarity, the capacitor is charged, during each cycle of rotor rotation, by two small and one large pulse. On the other hand, by choosing the polarity of the pulses 64, 64 the capacitor is charged by two large pulses during each cycle.

Figure 10:
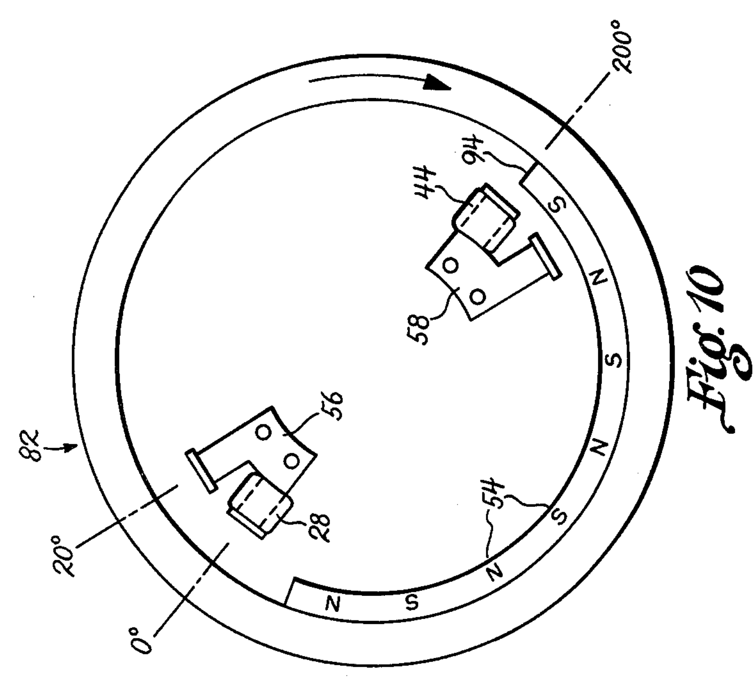
Figure 11:
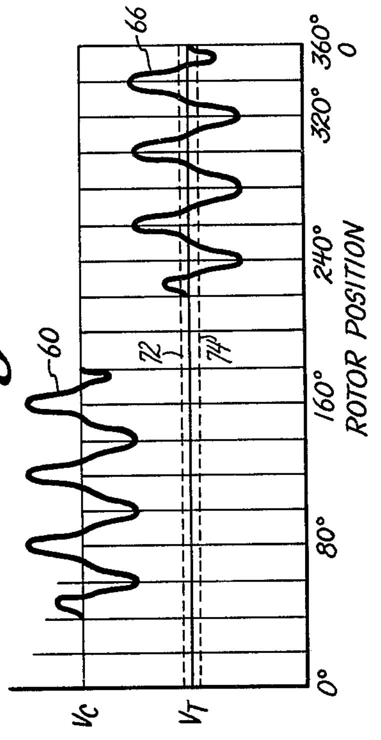
Figure 8:
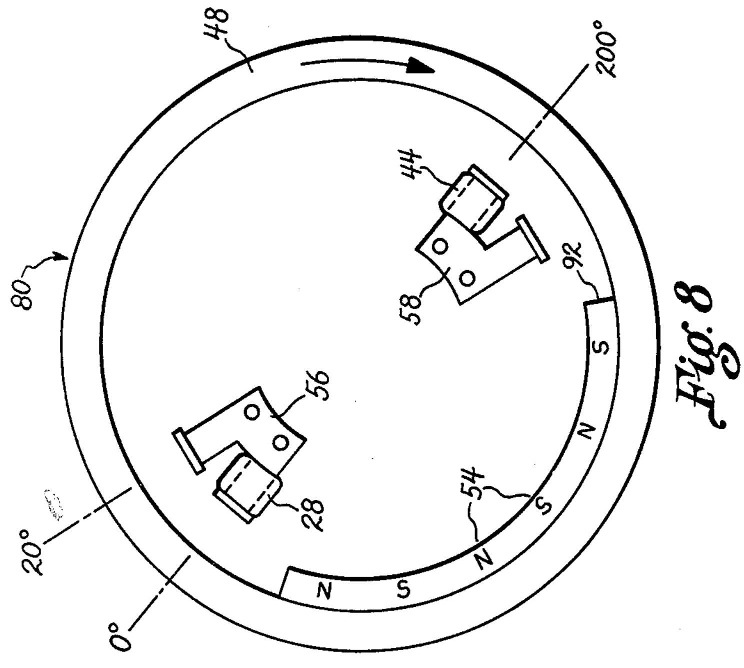
Figure 9:
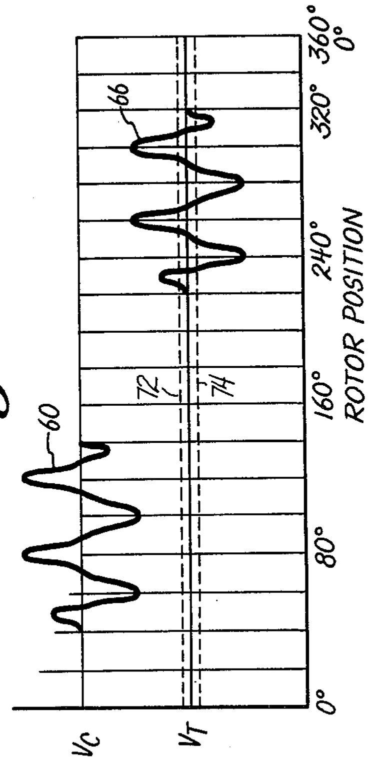
Figure 12:
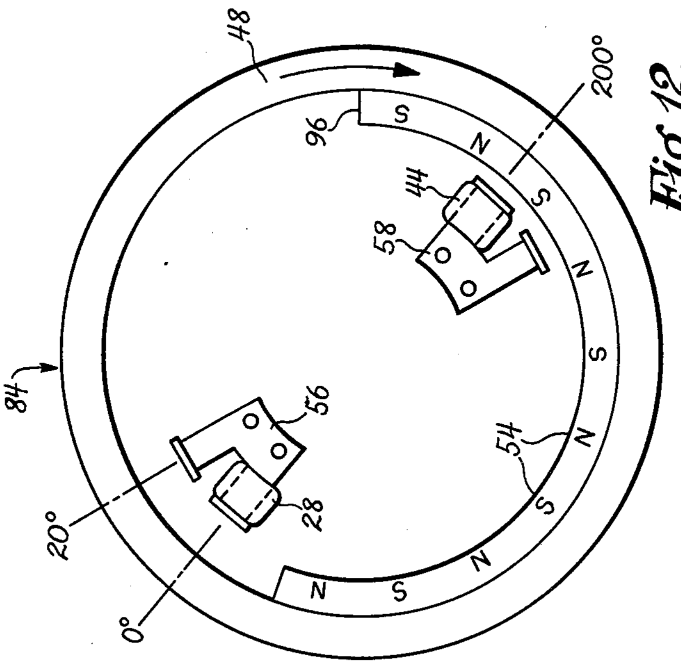
Figure 13:
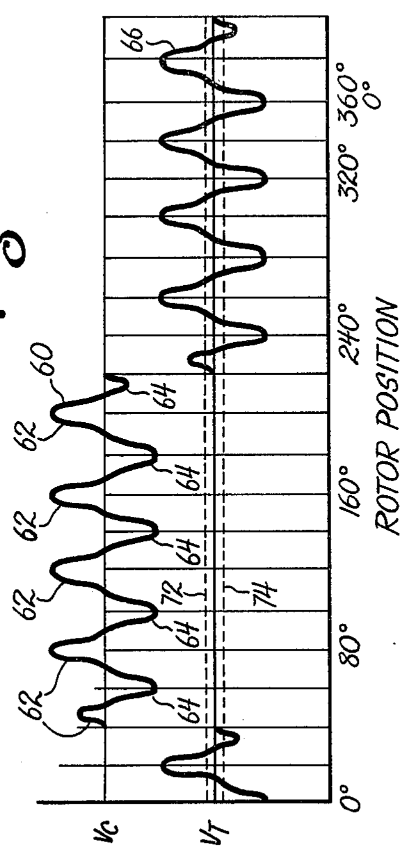

The generators 80, 82 and 84 of FIGS. 8, 10 and 12 are similar to the generator 46 of FIG. 1 except for having permanent magnets 92, 94 and 96 with six, eight and ten magnetic pole faces 54, 54 respectively. FIGS. 9, 11 and 13 in turn respectively show the waveforms induced in the charge and trigger coils of the generators 80, 82 and 84, the number of pulses of each waveform 60 and 66 increasing as the number of pole faces of the generator magnet is increased.

From FIGS. 3, 5, 7, 9, 11 and 13, it will also be observed that as the number of magnetic pole faces of the generator magnet is increased, the total duration of the waveforms 60 and 66 increase with the ending of one waveform approaching the beginning of the other. FIG. 13 represents the limiting condition in which the end of one waveform is followed immediately by the beginning of the next. That is, with the illustrated 20° spacing of the stator poles and of the magnetic pole faces, the charging voltage waveform 60 of FIG. 13 provides a maximum number of pulses which can be used to charge the capacitor.

Figure 14:
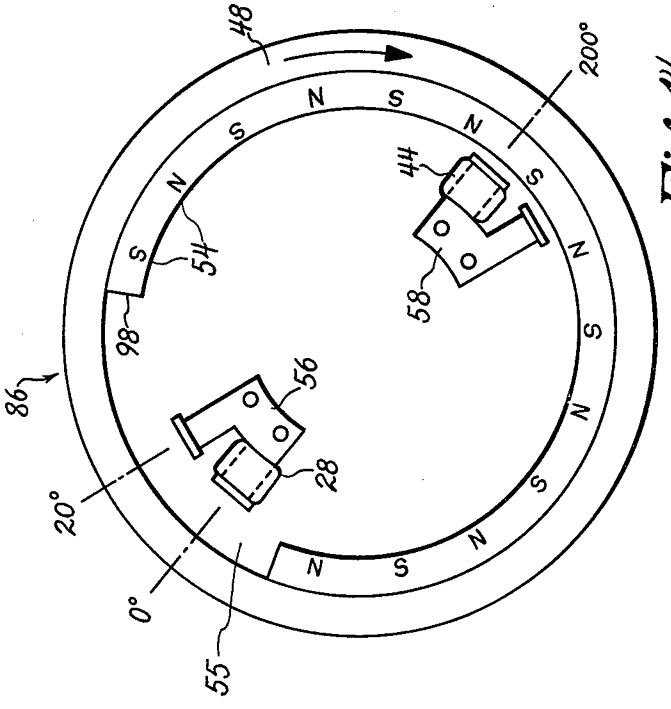

If the number of magnetic pole faces of the permanent magnet is increased beyond that of the magnet 96 of FIG. 12, a portion of the charge voltage waveform 60 will overlap with the trigger voltage waveform 66 so that some of the pulses of the trigger voltage waveform will occur simultaneously with the pulses of the charge voltage waveform and, by triggering the SCR 42 at the beginning of each charge voltage pulse, will prevent such pulse from charging the capacitor 26. For example, FIG. 14 shows a generator 86 having a magnet 98 with fourteen pole faces 54, 54, therefore leaving a space 55 along the circular path of the array of pole faces 54, 54 having a length equal to four pole face intervals. When the space 100 passes the trigger coil 44, no trigger pulses are induced in the trigger coil 44, but at the same time some pole faces 54, 54 of the magnet 98 pass the charge coil 28 and induce capacitor charging pulses therein which charge the capacitor. Then when the end of the space 55 leaves the trigger coil 44 and pole faces 54, 54 again move past its stator 58, the first of the trigger pulses induced therein triggers the SCR to discharge the capacitor and cause firing of the associated spark plug. Thereafter, further trigger pulses occur simultaneously with charge pulses to prevent further charging of the capacitor until the space 55 again moves past the trigger coil.

Figure 15:
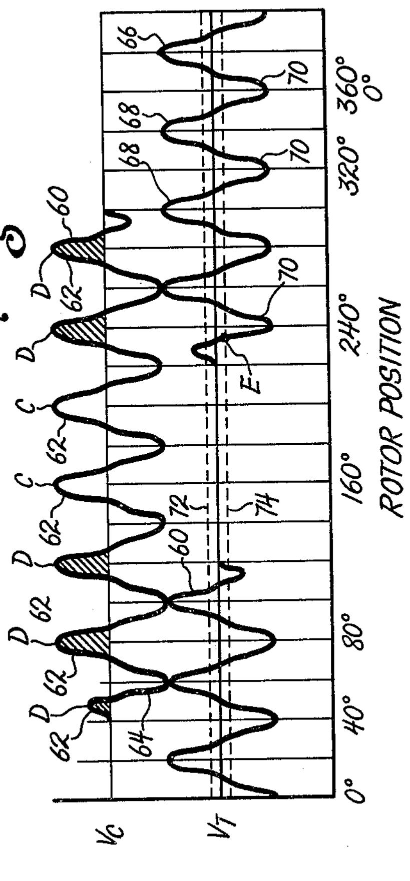

Referring to FIG. 15, and assuming that the pulses 62, 62 of the charge voltage waveform 60 are used to charge the capacitor and that the pulses 70, 70 of the trigger voltage waveform are used to trigger the SCR, the pulses 62, 62 which occur during the passage of the space 55 past the trigger coil, and which charge the capacitor, are indicated at C, there being two such pulses each cycle. Discharge of the capacitor and firing of the spark plug occur at the point E where the first trigger pulse 70 of the next waveform 66 reaches the trigger level voltage 74. Pulses 62, 62 of each waveform 60 which are of the correct polarity to charge the capacitor but which are prevented from doing so as a result of simultaneously occurring trigger pulses 70, 70 are shaded and indicated at D in FIG. 15.

Figure 16:
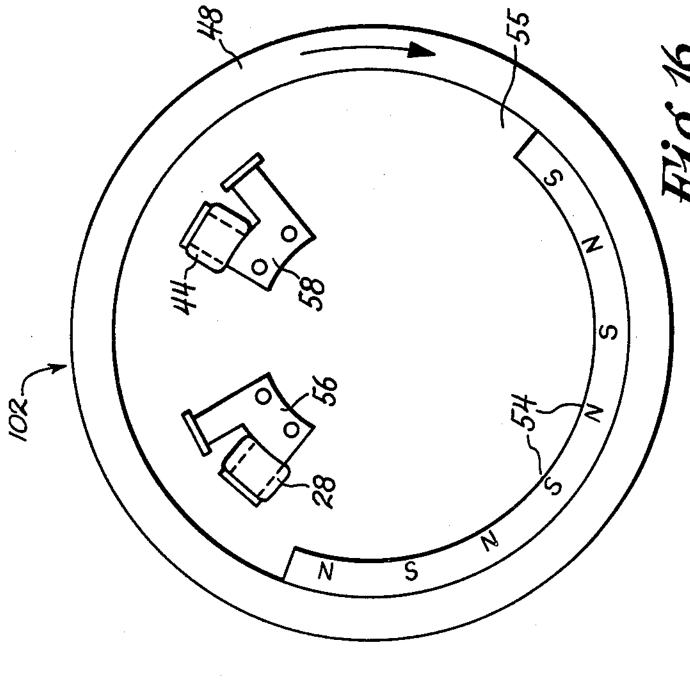
Figure 17:
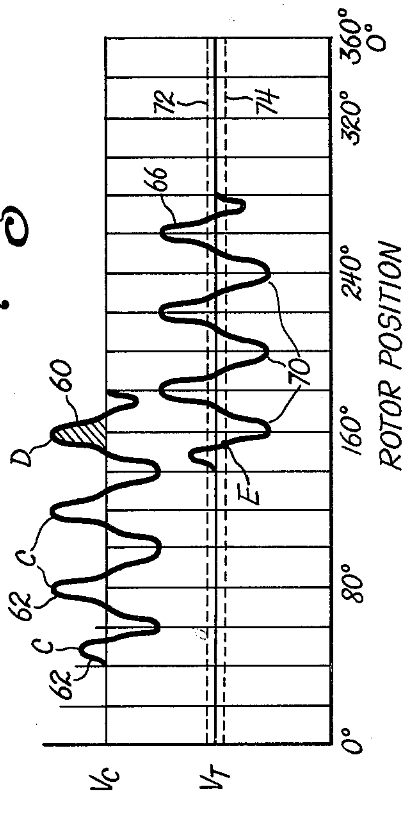

In all of the previously described generators, the charge coil 28 and the trigger coil 44 have been located 180° from one another. This placement of the two coils is not necessary, but their angular displacement does influence whether the charge voltage waveform 60 and trigger voltage waveform 66 overlap one another and thus the number of charge voltage pulses which are available for charging the capacitor. For example, FIG. 16 shows a generator 102 which is similar to the generator 82 of FIG. 10 except that the trigger coil 44 is spaced 80° rather than 180° from the charge coil 28. Therefore, as shown in FIG. 17, the charge voltage waveform 60 and the trigger voltage waveform 66 overlap. Assuming that the charge voltage pulses 62, 62 are used for capacitor charging and the trigger voltage pulses 70, 70 for triggering, the indicated pulses C of each waveform charge the capacitor, the pulse D is prevented from charging the capacitor by a simultaneously occurring trigger pulse 70, and discharge of the capacitor to fire the associated spark plug occurs at the point E.

Figure 18:
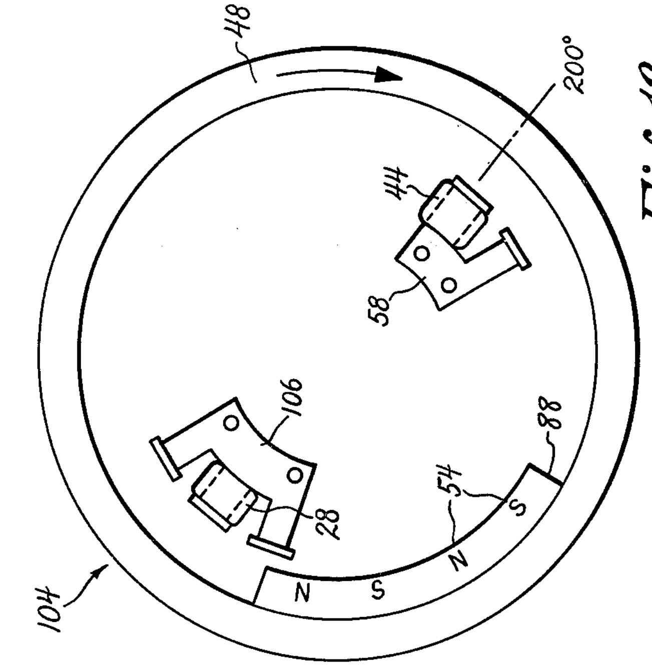
Figure 19:
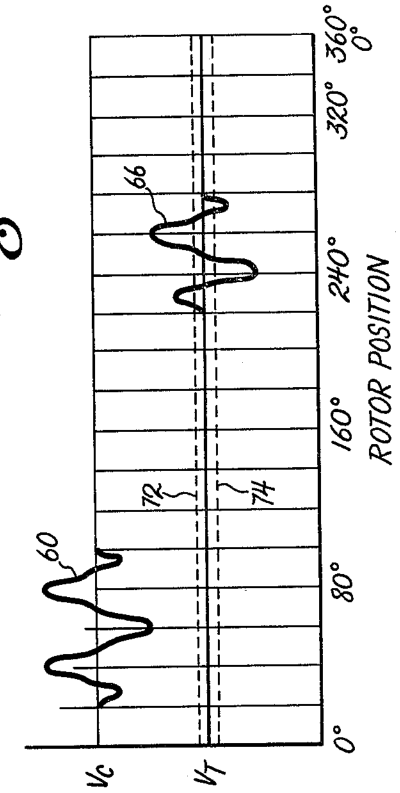

The waveforms induced in the charge coil 28 and trigger coil 44 are also dependent in part on the arrangement of their stator poles with respect to other poles of the stator. That is, if either of the coils is placed on a stator providing a pole on either side of the coil, rather than only on one side of the coil as do the two-legged stators 56, 58, an additional voltage pulse is produced in each waveform. For example, FIG. 18 shows a generator 104 which is similar to the generator 76 of FIG. 4 except that the charge coil 28 is received on a three-legged stator 106. Thus, as shown in FIG. 19, the charge voltage waveform 60 includes a total of five pulses rather than the four pulses of the waveform 60 of FIG. 5 produced by the generator 76.

In accordance with the invention, an advantage of the generators previously described is that the stator in addition to the illustrated charge and trigger coils may also support additional coils adjacent the circular path of the rotor's magnetic pole faces so that such pole faces also induce voltages in the additional coils to provide a source of auxiliary power. For example, FIG. 20 shows a generator 106 which is similar to the generator 86 of FIG. 14 except that the charge coil 28 and 44 are mounted on a single annular stator 108 having eighteen poles supporting, in addition to the coils 28 and 44, sixteen coils F, F connected to provide a power source for an associated load 109. FIG. 21 shows a circuit with which the generator 106 is used. For this, it will be seen that the charge and trigger coils 28 and 44 are part of a capacitor discharge ignition system similar to that of FIG. 2, and the sixteen coils F, F are connected to form four groups of four series connected coils, the four groups in turn being connected in parallel with one another for connection to the load 109.

To increase the charge supplied to the capacitor during each cycle of operation, additional charge coils may also be included in the generator. Also, the previously described generators are intended primarily for use with single cylinder engines having a single spark plug. In the case of multiple cylinder engines, the generator may be designed to include a corresponding multiple number of sets of trigger and charge coils. With reference to FIGS. 22 and 23, the generator 110 there shown is intended for use with a two cylinder engine and for each cylinder includes one trigger coil and a plurality of charge coils. Further, it also includes coils providing an auxiliary power output. In particular, referring to FIG. 22, the rotor 48 carries a permanent magnet 112 having fifteen pole faces 54, 54 and a space 55 equal in length to three pole face intervals. The stator has four stator segments 114, 114 each having four poles. One stator segment 114 carries one trigger coil 44B and three series connected charge coils 28A, 28A. Another segment 114, diametrically opposite from the first, carries another trigger coil 44A and three series connected charge coils 28B, 28B. The other two segments 114, 114 each carry four series connected auxiliary power coils F, F.

The interconnection of the coils of the generator 110 is shown in FIG. 23 from which it will be seen that the trigger and charge coils are part of two capacitor discharge systems serving two separate spark plugs 40A and 40B. The two groups of auxiliary power windings F, F are connected in parallel for connection to a load 109. It will also be understood from FIG. 22 that as the space 55 moves past one trigger coil 44A or 44B, magnetic pole faces 54, 54 are moving past the charge coils 28A, 28A or 28B, 28B of the associated capacitor discharge system to charge the associated capacitor 26A or 26B. Therefore as far as each capacitor is concerned it is charged during the absence of trigger pulses from its associated trigger coil and is discharged by the first trigger pulse of each trigger voltage waveform.

Still with reference to FIG. 22, the generator construction there shown also has the advantage that the auxiliary power coil carrying stator segments are separate from the remainder of the generator and therefore in the making of the generator may be included or omitted as desired. This accordingly allows one basic generator design to be easily modified to serve in either applications requiring or applications not requiring auxiliary power.

FIGS. 24 and 25 show a still further embodiment of the invention wherein the generator, indicated at 114, has a trigger coil which also serves as the primary coil of the ignition transformer and which is mounted on one of the stator poles in combination with the transformer secondary coil. Referring to FIG. 24, the generator 114 has a rotor 48 with a permanent magnet 116 with sixteen magnetic pole faces 54, 54. The stator 118 has a total of fourteen equally angularly spaced poles. Three of the stator poles carry charge windings 28, 28, eight poles carry auxiliary power windings F, F, and one pole, indicated at 120, carries a combined ignition transformer and trigger module 122. The two poles on either side of the pole 120 carry no coils. The module 122 has a plastic housing 124 which receives a trigger-primary coil 126 and a secondary coil 128. Other components of the capacitor discharge ignition system, namely the zener diode 130, diode 132, capacitor 134, SCR 136 and resistor 138 of FIG. 25 may also be included and potted in the housing 124, if desired, to make a more compact unit.

Referring to FIG. 25, the three charge coils 28, 28 are connected in series with one another. As the space 55 passes the pole 120 carrying the coil 126, magnet pole faces 54, 54 pass the charge coils 28, 28 and induce voltage pulses in them which charge the capacitor 134. Subsequently, when the magnetic pole faces again move over the stator pole 120 a series of trigger pulses is induced in the coil 126 and the first of these triggers the SCR 136 to discharge the capacitor 134 through the coil 126. During this discharge, the coil 126 serves as the primary coil of an ignition transformer and induces a high voltage in the secondary coil 128 to fire the associated spark plug 40. Thereafter, subsequent trigger pulses induced in the coil 126 prevent further charging of the capacitor 134 until the space 55 again passes the pole 120.

I claim:

1. In a capacitor discharge ignition and alternator auxiliary power system having a capacitor, a triggered electronic switch element responsive to trigger voltage pulses for discharging said capacitor, and a spark plug which fires in response to discharging of said capacitor, a generator for producing charge voltage pulses for charging said capacitor, for producing trigger voltage pulses for triggering said switch element, and for producing auxiliary power voltage pulses for an auxiliary power output, said generator including a stator means carrying a charge coil connected in charging relationship with said capacitor, a trigger coil connected in triggering relationship with said switch element, and at least one auxiliary power coil, a rotor providing an array of at least three magnetic pole faces in regularly spaced relation to one another along a circular path along which they move as said rotor rotates, said magnetic pole faces being of alternating magnetic polarity along said path, said charge coil being located adjacent said circular path so that each time said magnetic pole face array passes it, it has induced in it a series of repetitive charge pulses, said trigger coil being located adjacent said circular path so that each time said magnetic pole face array passes it, it has induced in it a series of repetitive trigger pulses which repetitively trigger said electronic switch, and said auxiliary power coil being located adjacent said circular path so that each time said magnetic pole face array passes it, it has induced in it a series of repetitive auxiliary power pulses, said array of magnetic pole faces extending less than the full circular extent of said path so as to provide a space along said path in which space no magnetic pole face appears, said charge coil and trigger coil being so arranged relative to one another that as said space during rotation of said rotor passes said trigger coil (thereby establishing a period during which no trigger pulses are induced in said trigger coil) at least a portion of said array passes said charge coil and produces at least one charge pulse which charges said capacitor whereby the charge so stored in said capacitor is subsequently discharged to fire said spark plug by the first trigger pulse of the series of repetitive trigger pulses produced when said array next passes said trigger coil and whereby further trigger pulses of said next series of repetitive trigger pulses occur while said capacitor is in a discharged state and do not cause firing of said spark plug.

2. In a capacitor discharge ignition and alternator auxiliary power system having a capacitor, a triggered electronic switch element responsive to trigger voltage pulses for discharging said capacitor, and a spark plug which fires in response to discharging of said capacitor: a generator as defined in claim 1 further characterized by said charge coil and said trigger coil being so arranged that some of the trigger pulses of each series of trigger pulses occur simultaneously with some of the charge pulses of each series of charge pulses and trigger said triggered switch element to prevent the simultaneously occurring charge pulses from charging said capacitor.

3. In a capacitor discharge ignition and alternator auxiliary power system having a capacitor, a triggered electronic switch element responsive to trigger voltage pulses for discharging said capacitor, and a spark plug which fires in response to discharging of said capacitor: a generator as defined in claim 1 further characterized by said array of magnetic pole faces extending more than half way around said circular path.

4. In a capacitor discharge ignition and alternator auxiliary power system having a capacitor, a triggered electronic switch element response to trigger voltage pulses for discharging said capacitor, and a spark plug which fires in response to discharging of said capacitor: a generator for producing charge voltage pulses for charging said capacitor, trigger voltage pulses for triggering said switch element, and auxiliary power voltage pulses for an auxiliary power output, said generator including a stator means carrying a charge coil connected in charging relationship with said capacitor, a trigger coil connected in triggering relationship with said switch element, and at least one auxiliary power coil, a rotor providing at least one array of at least three magnetic pole faces spaced from one another at regular intervals along a circular path along which they move as said rotor rotates, said magnetic pole faces being of alternating magnetic polarity along said path, said stator means having a first set of two poles, a second set of two poles, and a third set of two poles, the two poles of each of said sets being located next to one another adjacent said circular path and spaced from one another along said circular path by an interval equal to one of said regular intervals by which said magnetic pole faces are spaced from one another, said charge coil being carried by said stator means in such fashion that magnetic flux passing from one to the other of said two poles of said first set passes through said charge coil so that in each revolution of said rotor when said array of magnetic pole faces passes said first set of poles said charge coil has induced in it a plurality of repetitive charge pulses, said trigger coil being carried by said stator means in such fashion that magnetic flux passing from one to the other of said poles of said second set passes through said trigger coil so that in each revolution of said rotor when said array of magnetic pole faces passes said second set of poles said trigger coil has induced in it a plurality of repetitive trigger pulses each of which trigger said electronic switch, said auxiliary power coil being carried by said stator means in such fashion that magnetic flux passing from one to the other of said poles of said third set passes through said auxiliary power coil so that in each revolution of said rotor when said array of magnetic pole faces passes said third set of poles said auxiliary power coil has induced in it a plurality of repetitive auxiliary power pulses, said rotor along said circular path also having at least one space in which no magnetic pole face appears, said first and second sets of poles being so arranged relative to one another that within the time said space passes said second set of poles (thereby establishing a period during which no trigger pulses are induced in said trigger coil) at least some of said magnetic pole faces of said rotor pass said first set of poles and thereby induce at least one charge pulse in said charge coil which charges said capacitor, whereby the charge so stored in said capacitor is subsequently discharged to fire said spark plug by the first trigger pulse of the next plurality of repetitive trigger pulses induced in said trigger coil, and whereby further trigger pulses of said next plurality of repetitive trigger pulses occur while said capacitor is in a discharged state and do not cause firing of said spark plug.

5. In a capacitor discharge ignition and alternator auxiliary power system having a capacitor, a triggered electronic switch element responsive to trigger voltage pulses for discharging said capacitor, and a spark plug which fires in response to discharging of said capacitor: a generator as defined in claim 4 further characterized by said at least one space in which no magnetic pole face appears being equal in length to no less than that of two of said regular magnetic pole face intervals.

6. In a capacitor discharge ignition and alternator auxiliary power system having a capacitor, a triggered electronic switch element responsive to trigger voltage pulses for discharging said capacitor, and a spark plug which fires in response to discharging of said capacitor: a generator as defined in claim 4 further characterized by said charge coil and said trigger coil being so arranged that some of the trigger pulses of said plurality of repetitive trigger pulses produced during each revolution of said rotor occur simultaneously with some of the charge pulses of said plurality of charge pulses produced during each revolution of said rotor and trigger said triggered switch element to prevent the simultaneously occurring charge pulses from charging said capacitor.

7. In a capacitor discharge ignition and alternator auxiliary power system having a capacitor, a triggered electronic switch element, and a spark plug which fires in response to discharging of said capacitor, a generator for producing a charge voltage waveform for charging said capacitor, a triggering voltage waveform for triggering said switch, and an auxiliary power waveform for providing an auxiliary power output, said generator comprising a rotor, permanent magnetic means carried by said rotor providing an array of at least three magnetic pole faces arranged in spaced relation to one another along a circular path along which they move as said rotor rotates, said magnetic pole faces of said array being spaced from one another at regular intervals and being of alternating magnetic polarity along said path, said array of magnetic pole faces also extending for less than the full circular extent of said path so as to provide a space along said path equal in length to at least two of said magnetic pole face intervals and in which space no magnetic pole face appears, a charge coil, a trigger coil, and an auxiliary power coil, stator means providing a charge coil stator pole adjacent said circular path on which said charge coil is mounted, a trigger coil stator pole adjacent said circular path on which said trigger coil is mounted, and an auxiliary power coil stator pole adjacent said circular path on which said auxiliary power coil is mounted; charge circuit means connecting said charge coil to said capacitor so as to charge said capacitor during the occurrence of charge coil voltage pulses of at least one polarity; and trigger circuit means connecting said triggered electronic switch element to said trigger coil so as to be triggered by trigger coil pulses of one polarity, said trigger coil stator pole and charge coil stator pole being so positioned relative to one another that as said space passes said trigger coil stator pole during rotation of said rotor (thereby establishing a period during which no trigger pulses are induced in said trigger coil) at least some of said magnetic pole faces of said array pass said charge coil stator pole to induce in said charge coil a plurality of voltage pulses which charge said capacitor, whereby the charge so stored in said capacitor is subsequently discharged to fire said spark plug by the first trigger coil pulse of said one polarity next produced by said array of magnetic pole faces next passing said trigger coil pole and whereby other trigger coil pulses produced by said next passage of said array past said trigger coil pole occur while said capacitor is in a discharged state and do not cause firing of said spark plug.

8. In a capacitor discharge ignition and alternator auxiliary power system having a capacitor, a triggered electronic switch element, and a spark plug which fires in response to discharging of said capacitor, a generator for producing a charge voltage waveform for charging said capacitor, a triggering voltage waveform for triggering said switch, and an auxiliary power voltage waveform for an auxiliary power output, said generator comprising a rotor, a permanent magnet means carried by said rotor providing an array of at least three magnetic pole faces arranged in spaced relation to one another along a circular path along which they move as said rotor rotates, said magnetic pole faces of said array being spaced from one another at regular intervals and being of alternating magnetic polarity along said path, a charge coil, a trigger coil, and stator means providing a charge coil stator pole adjacent said circular path on which said charge coil is mounted so that each time said array of magnetic pole faces passes said charge coil stator pole it induces in said charge coil a charging open circuit voltage waveform consisting of consecutive charge coil voltage pulses of alternately opposite polarity, said stator means also providing a trigger coil stator pole adjacent said circular path on which said trigger coil is mounted so that each time said array of magnetic pole faces passes said trigger coil stator pole it induces in said trigger coil a trigger open circuit voltage waveform consisting of consecutive trigger coil voltage pulses of alternately opposite polarity one of which opposite polarities is a triggering polarity, said trigger coil stator pole being spaced along said circular path from said charge coil stator pole by a distance equal to no less than two of said regular magnetic pole face intervals; charge circuit means connecting said charge coil to said capacitor so as to charge said capacitor during the occurrence of charge coil voltage pulses of at least one polarity; and trigger circuit means connecting said triggered electronic switch element to said trigger coil so as to be triggered by trigger coil pulses of said triggering polarity, said array of magnetic pole faces extending for less than the full circular extent of said path so as to provide a space having a length along said path equal to no less than two of said regular magnetic pole face intervals in which space no magnetic pole face appears so that during each occurrence of at least some of said charge winding voltage pulses of one polarity no trigger winding voltage pulses of said triggering polarity are generated and charging of said capacitor is therefore enabled, whereby the charge so stored in said capacitor is subsequently discharged to fire said spark plug by the first trigger coil pulse of said triggering polarity produced by said array of magnetic pole faces next passing said trigger coil stator pole and whereby other trigger coil pulses produced by said next passage of said array past said trigger coil pole occur while said capacitor is in a discharged state and do not cause firing of said spark plug, said stator means also providing a plurality of other stator poles positioned along said circular path, an associated plurality of auxiliary power coils mounted on said other stator poles, and circuit means connected with said auxiliary power coils to derive an auxiliary power electrical output from said auxiliary power coils.

* * * * *